Patented Sept. 7, 1937

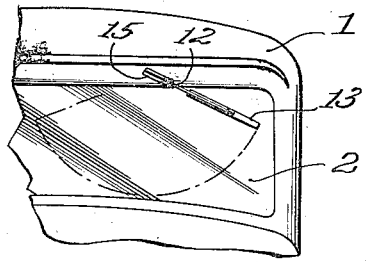
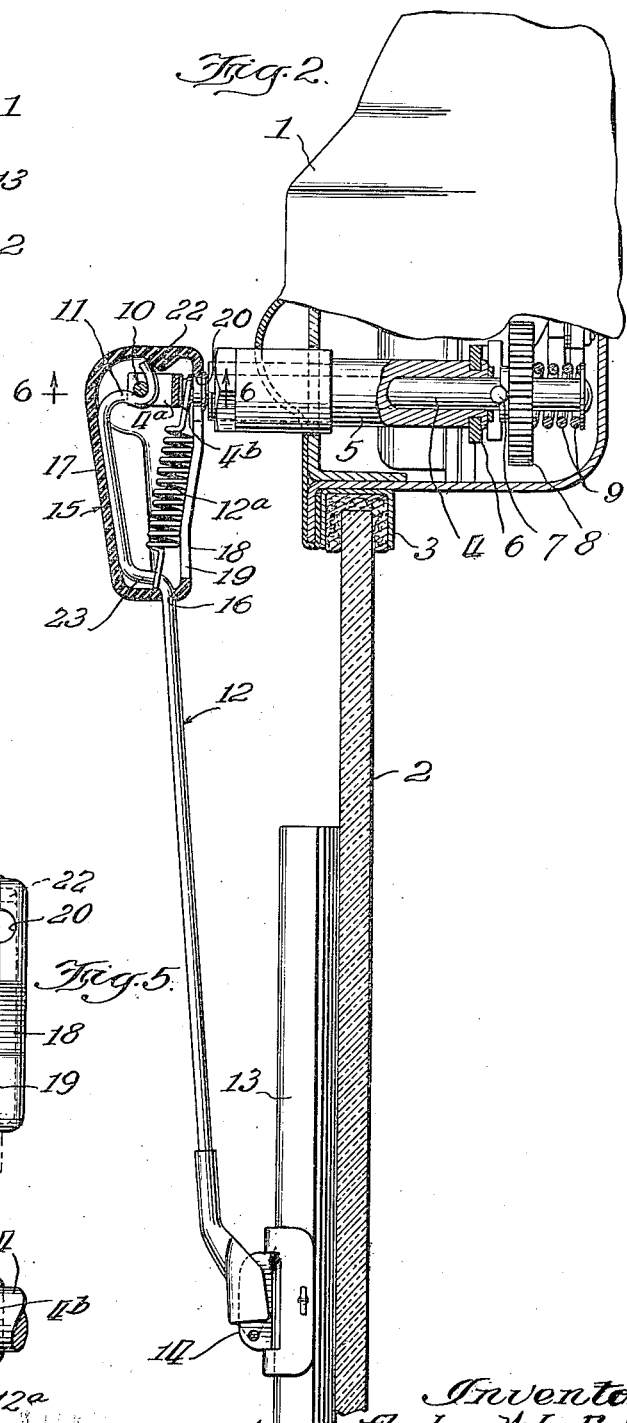
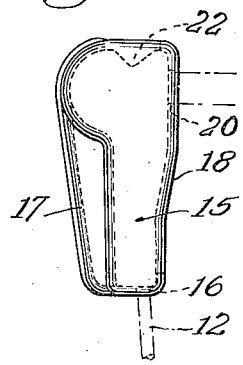
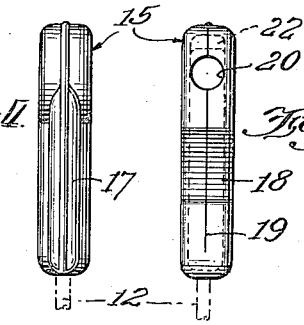
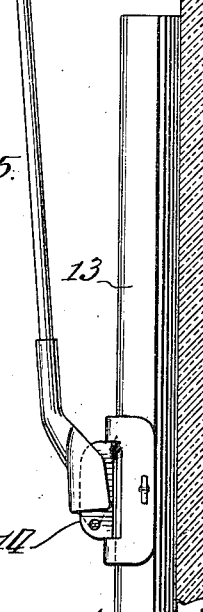
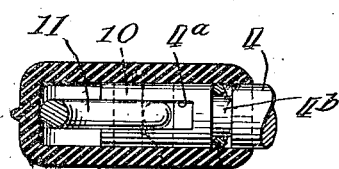

2,092,173

UNITED STATES PATENT OFFICE 2,092,173

WINDSHIELD CLEANER

Arden W. Le Fevre, Chicago, Ill., assignor to Stewart-Warner Corporation, Chicago, Ill., a corporation of Virginia Application June 14, 1935, Serial No. 26,559

2 Claims. (Cl. 15—255)

My invention relates to windshield cleaners, and more particularly to an improved dust cap for covering the connection between the wiper arm thereof and the driven shaft.

It is an object of my invention to provide an improved dust cap for the connection between the wiper arm and the driven shaft, which is simple in construction and may be economically manufactured.

A further object of my invention is the provision of an improved dust cap which is readily detachable and will not interfere with the removal of the wiper arm from the driven shaft.

A further object of my invention is the provision of a one-piece dust cap which will hold itself in place by its inherent resiliency and which does not require any additional means to fasten it in place.

A further object of my invention is the provision of a dust cap which is neat and trim in appearance, which will snugly embrace the connection between the wiper arm and its actuating shaft, and which will effectively protect the connection against the elements.

Other objects will appear from the following description, reference being had to the accompanying drawing, in which:

Fig. 1 is a fragmentary front elevation of the windshield of an automobile showing the wiper arm assembly as installed.

Fig. 2 is a fragmentary vertical cross sectional view showing the wiper arm, its actuating rock shaft, and the dust cap of my invention covering the connection between these parts.

Fig. 3 is a side view of the dust cap.

Fig. 4 is a front elevation thereof.

Fig. 5 is a rear elevation thereof.

Fig. 6 is an enlarged cross sectional view taken on the line 6—6 of Fig. 2.

The dust cap of my invention is shown as applied to a conventional type of windshield cleaner actuating mechanism and wiper arm assembly.

Referring to Figs. 1 and 2 of the drawing, the upper front portion 1 of the body of a vehicle has a windshield 2 held in a suitable frame 3. The drive mechanism comprises generally a wiper actuating or rock shaft 4 journaled in a sleeve 5 which is secured to a mounting plate 6. The shaft is provided with a pin 7 extending diametrically therethrough and the ends protruding from the shaft, the pin being engaged by V-notches cut in the hub of a gear 8 which is pressed toward the pin 7 by a relatively strong coil spring 9. During operation the gear 8 is oscillated by suitable actuating means which are not illustrated since they form no part of the present invention.

A pin 10 extends diametrically through the outer end portion of the shaft 4, which is slotted at 4a. The hook-shaped upper end 11 of the wiper arm 12 is inserted in this slot 4a and the lowermost bight of the hook part engages the pin 10. A tension coil spring 12a has one end anchored to a shoulder portion 23 of the wiper arm and has its other end hooked over the shaft 4 in an annular groove 4b thereof. The spring thus pulls the lower end of the wiper 12 toward the windshield, thereby assuring a firm wiping contact of a squeegee 13 with the surface of the windshield. The lower end of the wiper arm 12 may be detachably connected to the squeegee by any suitable known means.

The dust cap 15 is a hollowed one piece elastic member, preferably moulded of rubber or a rubber substitute, and is conformed snugly to fit over the parts by which the wiper arm 12 is detachably connected to the rock shaft 4. The wiper arm is inserted in the dust cap through a hole 16 formed in the lower end wall of the latter, the hole being of slightly smaller diameter than the arm so that the rubber will be stretched around the arm. The front portion 17 of the dust cap is narrower than the back portion, the width of the internal cavity being approximately the same as the diameter of the rock shaft 4 and spring 12 which it embraces. The lower end wall of the dust cap engages the shoulder 23 thus holding the bottom of the cap in place and prevents it from slipping upwardly on the wiper arm. As shown in Fig. 5, the rear portion 18 of the dust cap has a slit 19 extending nearly the full length thereof. The upper end of the slit 19 terminates in a hole 20 to receive the rock shaft 4. The slit 19 is sufficiently long so that by slight flexing the dust cap can be passed over the coupled parts and upon resuming its natural shape engage the shaft 4 and enclose the spring 12.

Extending downwardly from the top wall of the dust cap is an integrally formed projection or lug 22. As shown in Fig. 3, this projection is so positioned and so shaped that when the dust cap is in place the projection engages the extreme end of the portion 11 of the wiper arm. The over-all length of the pocket or cavity in the dust cap is preferably made slightly less than the over-all length of the parts which it encloses, making it necessary slightly to stretch the cap lengthwise to enable the projection 22 to pass over the upper extremity of the wiper arm when attaching the dust cap.

The projection 22 by its engagement with the extremity of the wiper arm holds the dust cap in place. The dimensions of the dust cap are such that it fits tightly over all the parts, its walls being preferably under slight tension when it is in place, so that they will not become loosened or displaced when the wiper is operated.

The dust cap is fitted over the rock shaft wiper arm connection by passing the lower end of the wiper arm through the hole 16 and sliding it through until the shoulder 23 engages the lower end wall. The slit 19 is then spread open and the cap passed over the upper extremity of the wiper arm, around the rock shaft and enclosing the tension spring as shown in Fig. 2. The shoulder portion 23 of the wiper arm prevents the dust cap from slipping upwardly when it is stretched over the connecting parts. The cap may be readily removed by stretching it sufficiently to pass over the parts.

It will be noted that this dust cap, being conformed to fit snugly over the wiper arm rock shaft connection will prevent rain, dust and the like from coming in contact with and corroding these parts. The cap is preferably moulded in one piece and need not be made of the highest grade rubber. As a result its cost will be considerably less than a corresponding metal casing. It is sufficiently flexible that it may be, without great effort, stretched by the fingers when being attached or removed, yet it is strong enough to hold itself in place.

Having thus described my invention what I claim as new and desire to secure by Letters Patent of the United States is:

1. A windshield cleaner having an actuating shaft, a wiper arm, means including a spring for detachably connecting said wiper arm to the end of said shaft, and a one-piece moulded hollow cap of rubber-like substance conformed snugly to enclose said connecting means and the adjacent portions of said wiper arm and rock shaft, said cap having a normally substantially closed slit therein whereby it may easily be attached to and removed from said shaft, arm, and spring.

2. As an article of manufacture a hollow dust cap of moulded elastic rubber, having a normally substantially closed slit in one side thereof to permit insertion thereinto of the connection joint between a windshield wiper actuating shaft and the wiper arm, the cap being conformed to enclose and resiliently embrace said connection.

ARDEN W. LE FEVRE.